Aug. 9, 1927.　　　　　J. G. COFFIN　　　　　1,638,111
TIRE TESTING APPARATUS
Filed Nov. 24, 1923　　　3 Sheets-Sheet 2
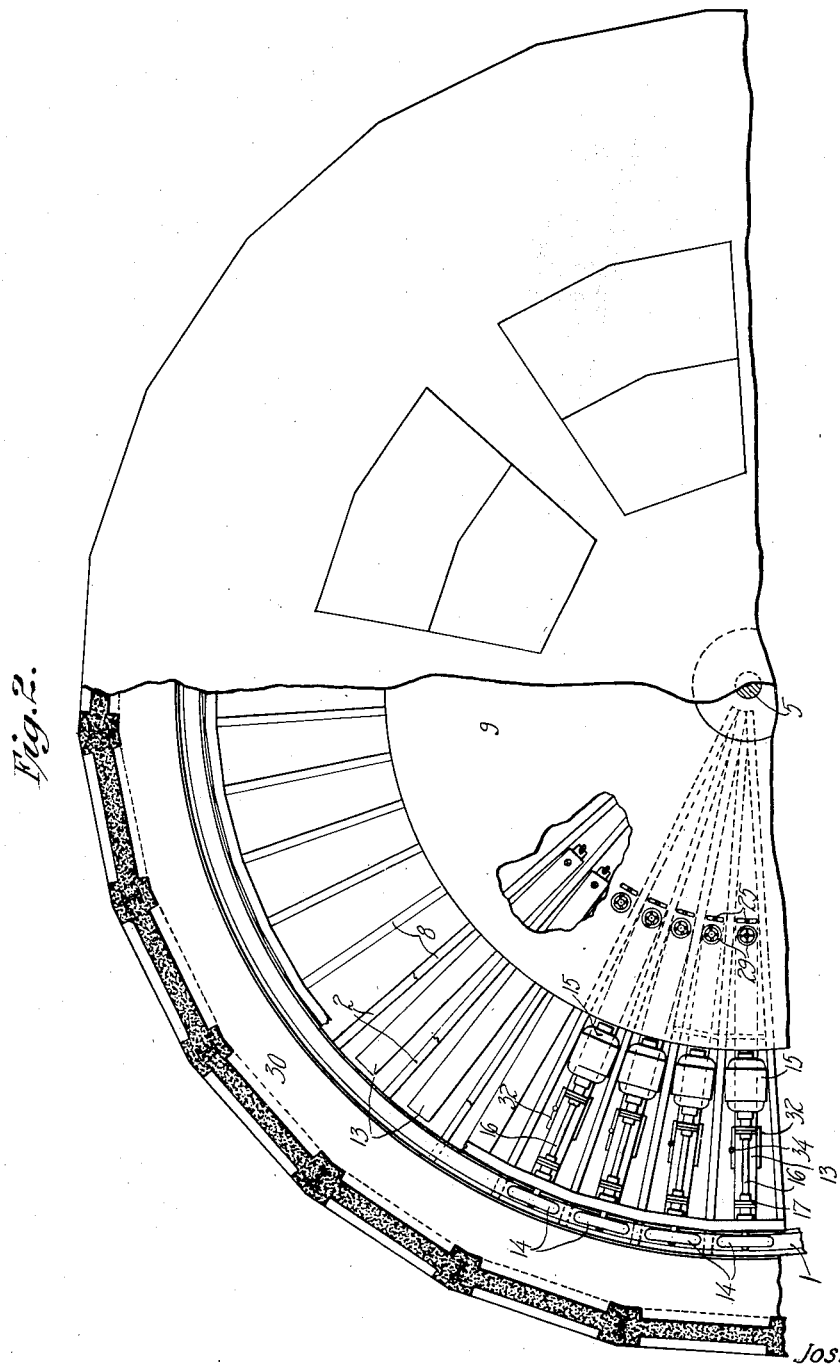
INVENTOR
JOSEPH G. COFFIN
BY
HIS ATTORNEY Aug. 9, 1927.

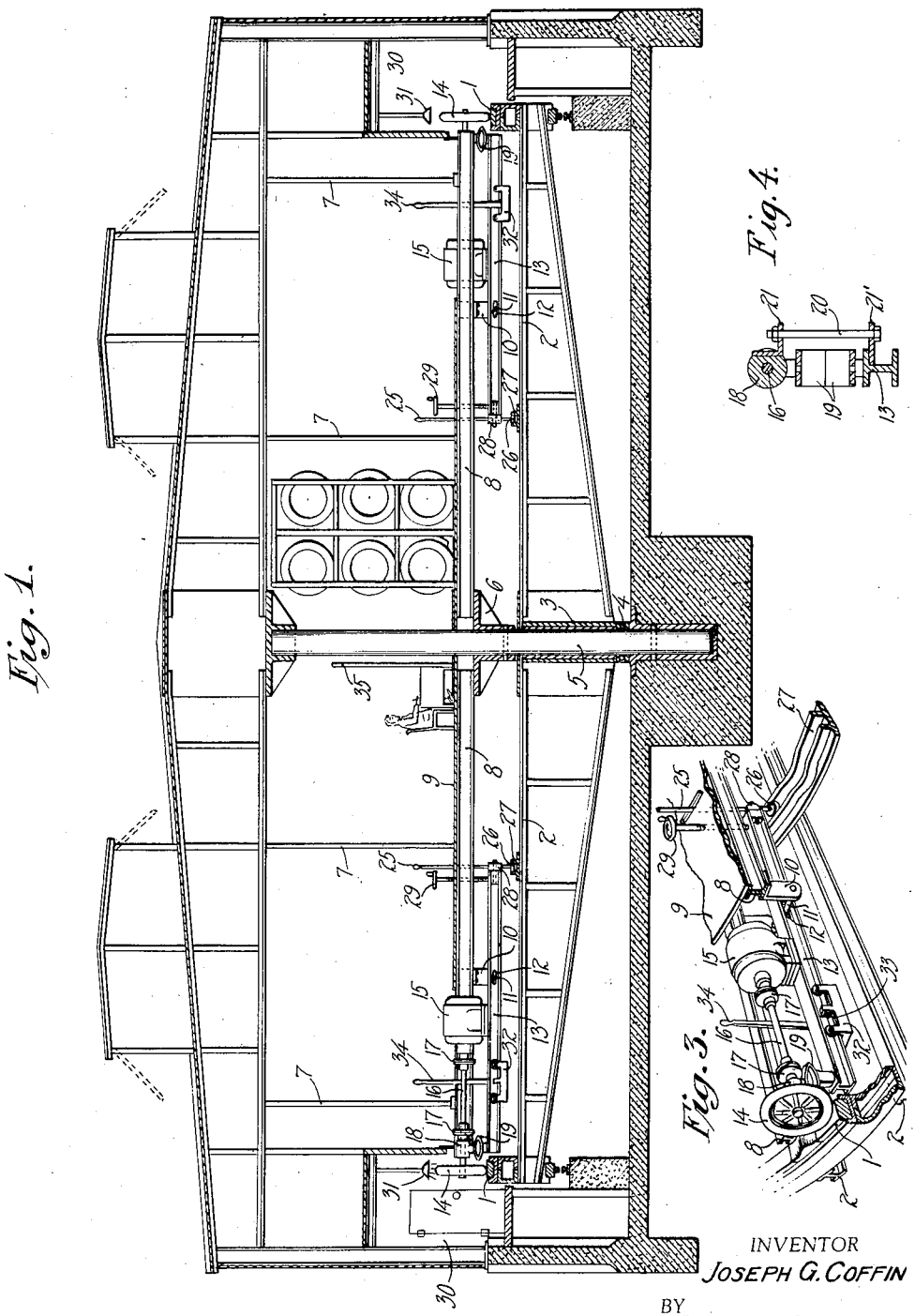

J. G. COFFIN 1,638,111

TIRE TESTING APPARATUS

Filed Nov. 24, 1923

Inventor
JOSEPH G. COFFIN
By his Attorney
Ernest Hopkinson

Patented Aug. 9, 1927.

1,638,111

UNITED STATES PATENT OFFICE.

JOSEPH G. COFFIN, OF HEMPSTEAD, NEW YORK, ASSIGNOR TO MORGAN & WRIGHT, OF DETROIT, MICHIGAN, A CORPORATION OF MICHIGAN.

TIRE-TESTING APPARATUS.

Application filed November 24, 1923. Serial No. 676,713.

The invention aims to provide an apparatus for testing any number or kind of tires under duplicate or pre-determined relative conditions so that the results are, or may be, comparable without making conjectural allowances, for conducting the tests, if desired, under substantially service conditions of temperature and humidity and simultaneously, for conducting the tests so as to eliminate the variable personal element, such as is introduced by drivers of test cars, for reducing the cost of testing tires, for enabling test results to be obtained quickly and the data collected and analyzed promptly, and for testing tires under any desired load.

With the illustrated embodiment in mind and without intention to limit the scope more than is required by the prior art, the invention may be described, briefly, as consisting in a revoluble annular wear surface, or "carousel," which is engaged and driven by a plurality of tires each individually supported and driven, or braked by a motor (acting as a generator), the various tires being under any desired individual loads and free to move to a limited extent in a direction perpendicular to the wear surface so as to approximate, if not duplicate, service conditions on a vehicle. Means may be provided for jogging the tires so as to simulate side-sway in service, and for subjecting the tires to heat or water treatment during their tests.

An embodiment of the invention is illustrated in the accompanying drawings, in which:—

Figure 1 is a sectional elevation of one form of the apparatus;

Figure 2 is a fragmentary plan view thereof, partly in section;

Figure 3 is a perspective;

Figure 4 is a sectional detail through a bearing adjacent the tire;

Figure 5:
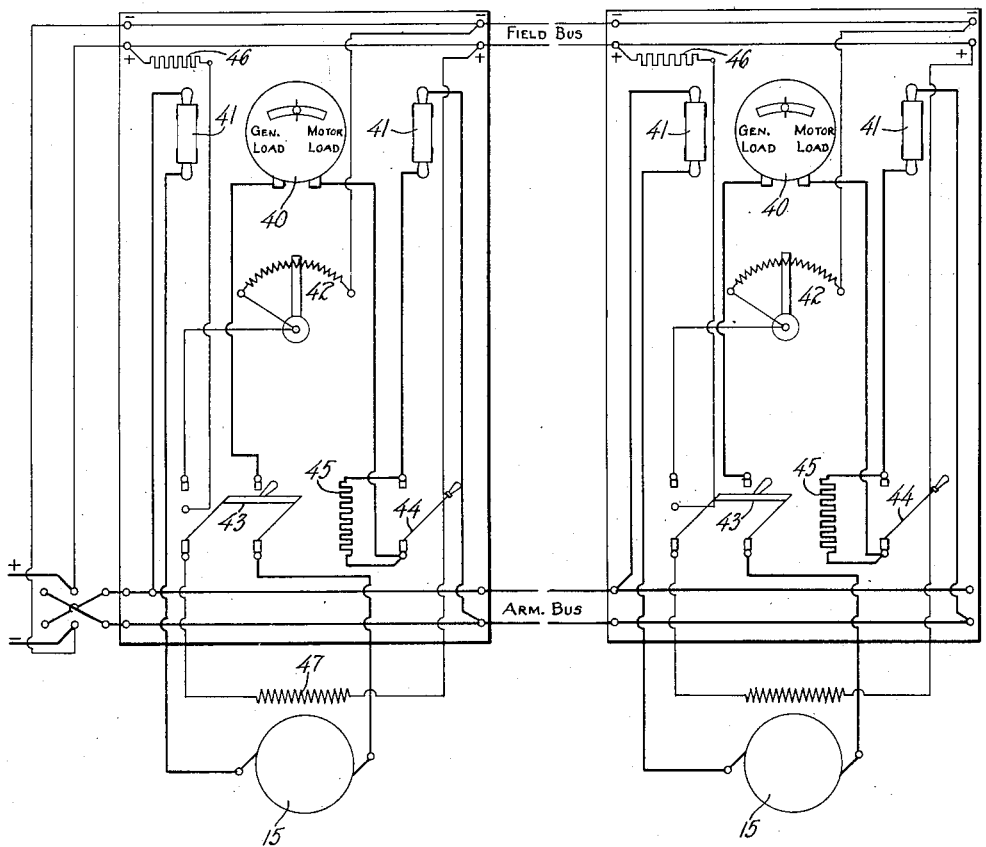

And Figure 5 is a wiring diagram.

Referring to the drawings, an annular wear surface, indicated at 1—which may be of any suitable material and made with portions (preferably changeable, reversible, and/or replaceable) surfaced with cobblestones, concrete, and/or obstructions in simulation of roadways and the conditions encountered by vehicles in ordinary use— is provided and constructed for free rotation in any suitable manner about an upright central axis. While this annular wear surface 1 may be in the form of a ring with anti-friction rollers or wheels beneath, it is preferred to support the surface 1 on arms 2 of structural steel from a central hub 3, which is revolubly sustained on any suitable form of anti-friction or thrust-bearing 4, about the central stationary shaft 5.

Fixed to the stationary shaft 5, as by the brackets 6, and with supplemental supports, if necessary, in the form of hangers 7, are floor-beams 8, on which a flooring or walking surface 9, of any suitable type, may be laid.

While the tires to be tested may be variously supported, loaded and driven, and the invention is not limited in this respect, a suitable construction embodying the principles of the invention is illustrated in the drawings and comprises posts 10, depending from the floor-beams 8, each carrying a fulcrum member 11, entering a slot 12 provided in the beams 13, which function as levers. There is one of these beams or levers for sustaining each of the tires 14. and its driving member, preferably an electrical motor 15, whose weight is utilized as a part of the load on the tires, by preference but not necessarily. Each tire is supported by a shaft 16 with flexible couplings 17 connecting it with its motor. Each motor 15 is fixed to one of the beams or levers 13, to one side of fulcra 11. Shaft 16, adjacent the tire, is provided with a bearing 18, which is adapted to be either yieldingly or rigidly connected to the lever by a spring 19 or bolt 20 respectively. The bolts 20 may be used when desired to eliminate the springs 19 by passing them through holes in brackets 21—21' anchored to the bearings 18 and beams 13, respectively. The weight of the motor and the unbalanced portion of the lever may be applied or transmitted either elastically (as in road service), or rigidly, to the bearing and through the shaft 16 to the tire.

The inner end of the lever or beam 13 is preferably equipped with a hand-lever 25, whose lower end carries a follower 26, that is adapted to be engaged at will in an annular side-sway cam 27 fast to the arms 2, the hand-lever being fulcrumed at 28 to the beam or lever. In order to limit the movement of the beam or lever 13, a stop 29 may be provided and suitably adjusted so that in case one of the tires blows out (if it be a pneumatic tire), running on the rim which carries the tire may be prevented. This stop 29 may also be utilized to manually lift the tire out of engagement with the annular wear surface when desired, as for inspection and replacement purposes.

Optionally, an annular chamber 30 may be provided and it may be divided by partitions into compartments for each or any suitable number of the tires. A heated medium may be supplied to this chamber (or chambers) so as to subject the tires to a pre-determined temperature, preferably around 90° F. And any suitable means may be used to regulate the temperature and humidity of the atmosphere surrounding the tires. If desired, sprays 31 may be mounted so as to direct water, oil, or other suitable fluid, onto the tires while running. Thus, any number, or all, of the tires may be subjected to pre-determined conditions of temperature and/or moisture during their tests. A sliding weight 32, normally held by a spring finger 33 in any position to which it may be moved through upright shift-arm 34, may be provided for convenient variation of the load applied to each tire.

While it is prefererd to individually drive each tire from an electric motor, it is, of course, obvious that any other suitable motive power may be employed, or a mechanical drive from a single prime mover might be provided with disengageable driving connections with each of the tire-carrying shafts. For a variety of reasons, however, it is preferred to employ electric motors and to suitably wire these up with a switch-board 35, at which an operator may be stationed, as illustrated, to govern the conduct of the tests. All of the motors may be supplied with current and each of the tires rotated, or some of the motors may be supplied with current and the others allowed to operate as generators, feeding back into the line. In either case, however, the tires are subjected to substantially service conditions and service torques, although those tires whose motors are acting as generators, by reason of the braking action of their armatures, are strained in a direction opposite to those tires whose motors are being supplied with current. The various electrical connections and wiring are illustrated diagrammatically in Figure 5 of the drawings, later to be described.

The operation of the device will be clear from what has already been stated in the detailed description. The track 1 is rotated by some, or all, of the tires 14. Whenever it is desired to examine one or more of the tires under test, or to replace one or more which have been completely tested, an attendant merely depresses the stop-screw 29 so as to raise the tire, its power drive is discontinued, and the tested tire removed and replaced by another which is to be tested. There is no difficulty in doing this, in the preferred form of the invention at least, as the tires each revolve about a relatively fixed axis. Access may be had to the tires through the annular chamber 30, or chambers into which the same may be divided, or otherwise as convenient.

The apparatus permits tires to be tested in a very short time, approximately five or six days, under conditions which are reproduceable at will. The apparatus is economical and yields test results which are reliable and comparable, and, therefore, permits accurate deductions to be drawn concerning the performance and character of particular construction and make-up of tires. The apparatus involves no peculiar and special parts, and when motors are used to rotate the tires—these are preferably of a direct current type and from 5 to 7½ horsepower—they may be operated between 200 and 300 R. P. M., which is sufficiently slow speed to yield long service.

The size of the apparatus may, of course, be varied widely. For practical purposes, however, it is preferred to make the annular wear surface at around 75 feet in diameter, which would permit around fifty 35″ tires to be tested with a space between each of them. During test of the tires at a speed of 30 miles per hour, a track 1 of this diameter revolves between 10 and 15 R. P. M. By employing a suitable type of thrust-bearing (preferably rotating in oil), the apparatus may be rendered practically noiseless. These and many other advantages will occur to those skilled in the art.

In Figure 5 of the drawings, a wiring diagram for two of the motor (generator) units is shown. On the switch-board 35, there will be one panel (similar to half of Figure 5) for each of the motors 15. Each of the motors connected with the tires is similarly wired up with a panel on the switchboard 35 and, hence, a description of one panel will serve for all. Referring to Figure 5, an ammeter is shown at 40, calibrated, preferably, to read generator load on the left side and motor load on the right side. The load may be varied by regulating the field rheostat 42. Fuses 41 are preferably inserted in the armature circuit. To vary the field resistance, a rheostat 42 is preferably provided. At 43 is shown a starting switch which, preferably, simultaneously connects the field and ammeter. At 44 is shown another switch for cutting out the resistor 45 after the motor has accelerated. This resistor 45 also acts as a protective resistance when additional machines are thrown in. At 46 is indicated a field discharge resistance and 47 indicates the field.

At 15, the motor (generator) units are shown diagrammatically.

In operation, considering only two motors 15 to be operated, one as a motor and the other as a generator—to start one of the motors 15, close switch 43 while switch 44 is open and while the rheostat 42 is set at normal speed. When the motor has accelerated, close switch 44, cutting out resistor 45. The motor will now operate as a propelling motor driving the tires and therethrough the annular wear surface.

Consider another motor 15, for instance that connected to the panel shown at the right of Figure 5. Assume that it is to be operated as a generator. Proceed as above described except before closing switch 44, adjust the field rheostat 42 until ammeter 40 shows zero load. Then the generator load can be adjusted so as to increase or decrease the load on the motors acting to propel the wear surface 1, the ammeters 40 on the panels of which other motors will indicate the respective combined generator and friction loads.

It will be obvious that many changes may be made in the details of construction without departing from the principles underlying the invention. Variations in organization or form, not departing from the essence of the invention,—which is understood at this time to reside in the combination of a freely revcluble wear surface with a relatively stationary platform or member on which a number of tires may be supported and driven (or rotated) in contacting relation with the annular wear surface—are intended to be comprehended in the accompanying claims to which reference should be made for an understanding of the scope of the invention.

Having thus described my invention, what I claim and desire to protect by Letters Patent is:—

1. Tire testing apparatus including in combination, a multiplicity of tire-supporting devices permitting independent rotation of tires thereon, a member having a surface adapted to engage and wear out tires on said supports and extending at the point of contact therewith substantially parallel to the axis of revolution of each tire, said tire supporting devices being substantially fixed against displacement in the direction of travel of said member, and means for relatively moving the supporting devices and member.

2. Tire testing apparatus including in combination, means for rotatably and independently supporting a multiplicity of tires, means for wearing out the tires revolubly about an axis at substantially right angles to the axes of revolution of the tires, the means for rotatably supporting a multiplicity of tires being substantially fixed against displacement in the direction of travel of the last mentioned means for wearing out the tires, and means for relatively moving the two means first mentioned.

3. Tire testing apparatus including in combination, a multiplicity of tire-supporting devices permitting independent rotation of tires thereon, a member having a surface adapted to engage and wear out tires on said supports and extending at the point of contact therewith substantially parallel to the axis of revolution of each tire, means for relatively moving the supporting devices and member, and housing means in which the tires being tested may be subjected to desired conditions of temperature during their test.

4. Tire testing apparatus including in combination, a revoluble annular wear surface, a plurality of revoluble tire supports substantially fixed against displacement in the direction of travel of the wear surface, and independent means for rotating each of said tire supports about its axis and through the tires the wear surface.

5. Tire testing apparatus including in combination, an annular wear surface revoluble about a fixed central axis, a plurality of devices for individually supporting tires in contact with said surface, and independent means for rotating each tire-supporting device and turning the wear surface with tires mounted on the devices, each of the plurality of devices for individually supporting tires being substantially fixed against displacement in the direction of travel of the wear surface.

6. Tire testing apparatus including in combination, an annular and freely revoluble wear surface, and independent means for separately rotating each of a multiplicity of tires in driving contact with said surface.

7. Tire testing apparatus including in combination, an annular and revoluble wear surface, a plurality of tire-holders arranged to support tires in contact with said surface, means for rotating each tire-holder and thereby running the tires in wearing contact with said surface, and a lever supporting each of said tire-holders free to move in a plane substantially perpendicular to the wear surface.

8. Tire testing apparatus including in combination, an annular and revoluble wear surface, a plurality of tire-holders arranged to support tires in contact with said surface, means for rotating each tire-holder and thereby running the tires in wearing contact with said surface, a lever supporting each of said tire-holders free to move in a plane substantially perpendicular to the wear surface, and means for shifting said lever to subject the tires being tested to side-sway.

9. Tire testing apparatus including in combination, an annular and revoluble wear surface, a plurality of tire-holders arranged to support tires in contact with said surface, means for rotating each tire-holder and thereby running the tires in contact with said surface, a lever supporting each of said tire-holders free to move in a plane substantially perpendicular to the wear surface, and means engageable at will for intermittently shifting said lever to subject the tires being tested to side-sway.

10. Tire testing apparatus including in combination a revoluble annular wear surface, a plurality of supports for tires permitting them to be rotated about their axes and independently, means for rotating the tires and therethrough the annular wear surface, means for sustaining the tire-supports so as to permit loading the tires in simulation of service conditions, and means for holding the tire-supports against displacement in the direction of travel of the wear surface.

11. Tire testing apparatus including in combination a revoluble annular wear surface, a plurality of supports for tires permitting them to be rotated about their axes and independently, means for rotating the tires and therethrough the annular wear surface, means for sustaining the tire-supports so as to permit loading the tires in simulation of service conditions, means for holding the tire-supports against displacement in the direction of travel of the wear surface, and means engageable at will for jogging each of the tires in simulation of side-sway in service.

12. Tire testing apparatus including in combination a revoluble annular wear surface, a plurality of revoluble tire-supports substantially fixed against displacement in the direction of travel of the wear surface, a plurality of motors, a flexible driving connection between each of the motors and the tire-supports, and a member for sustaining each of said motors and tire-supports arranged to permit each of the tires to move freely at right angles to the wear surface but to restrain the tire-supports from displacement in the direction of travel of the wear surface whereby the wear surface is adapted to be tractively driven by the tires.

13. Tire testing apparatus including in combination a revoluble annular wear surface, individual sources of motive power individual to each tire, and independent means for supporting and rotating each of a plurality of tires, said supporting means being constructed to permit variably loading the tires.

14. Tire testing apparatus including in combination a revoluble annular wear surface, means for independently supporting and rotating each of a plurality of tires, said supporting means being constructed to permit loading the tires individually, and means for applying the load at will to the tire-supports through elastic or inelastic means.

15. Tire testing apparatus including in combination a revoluble annular wear surface, means for supporting tires in engagement with said wear surface, means for rotating said tires, and means for moving the tire supporting means to shift the tires from a position in engagement with said wear surface to a position out of engagement therewith, whereby one or more of the tires may be removed or replaced without interrupting the testing of the remaining tires.

16. Tire testing apparatus including in combination a revoluble annular wear surface, means for rotating and supporting tires in engagement with said wear surface and under load, means permitting the testing of any one or more of the tires to be performed without interrupting the testing of the remaining tires, and a stationary central platform facilitating access to each of the plurality of tire-supports.

17. Tire testing apparatus including in combination a revoluble annular wear surface, a plurality of revoluble tire supports substantially fixed against displacement in the direction of extent of the annular wear surface, and means for producing a relative movement between the wear surface and the tire-supports so as to test tires thereon said wear surface being revoluble about an axis at right angles to the axis of revolution of tires mounted on said tire-supports.

Signed at New York city, county of New York, and State of New York, this 22nd day of November, 1923.

JOSEPH G. COFFIN.